United States Patent [19]

Leak et al.

[11] 3,776,718

[45] Dec. 4, 1973

[54] RECOVERY OF COPPER AND STEEL FROM SCRAP

[75] Inventors: Vance G. Leak; Morris M. Fine, both of Minneapolis, Minn.

[73] Assignee: The United States of America as represented by the Secretary of the Interior, Washington, D.C.

[22] Filed: July 13, 1972

[21] Appl. No.: 271,340

[52] U.S. Cl.............................. 75/63, 75/65, 75/72
[51] Int. Cl. ........................ C22b 7/00, C22b 15/00
[58] Field of Search............................ 75/72, 65, 63

[56] References Cited
UNITED STATES PATENTS
3,634,068    1/1972    Foard..................................... 75/72

OTHER PUBLICATIONS
Secondary Raw Materials Vol. 6, No. 7 July 1968 pp. 27–29.

*Primary Examiner*—A. B. Curtis
*Assistant Examiner*—Mark Bell
*Attorney*—Ernest S. Cohen et al.

[57] ABSTRACT

Scrap items containing copper and iron in physical admixture, such as electrical and electronic scrap, are pretreated with an aqueous reagent, such as an alkali metal sulfate or silicate, prior to recovery of the copper by preferential melting in an inert, liquid medium. The chemical pretreatment reduces the tendency of copper to alloy or braze with the iron and results in a substantially higher copper recovery in the preferential melting step.

13 Claims, No Drawings

RECOVERY OF COPPER AND STEEL FROM SCRAP

BACKGROUND OF THE INVENTION

Iron and copper are fabricated into intricate mechanical composites in the production of electrical and electronic components. Examples include motor armatures, field cores, transformers, copper-clad wire and a host of other electrical and electronic devices. Both the copper and the iron (often high-silicon steel) contained in such devices have a high scrap value but each material is a deleterious contaminant of the other. It is not practical with present technology to make a clean separation of the two materials except by tedious hand disassembly. Since processing economics is usually the sole consideration in determining whether to recover secondary metals from particular scrap commodities, much electrical and electronic scrap is at this time discarded rather than being reclaimed.

Preferential melting or sweating techniques would seem to be an appropriate means for separating copper and steel considering the wide spread in melting points, 1,083° and about 1,450° C, respectively. Sweating techniques are effective in reclaiming the low-melting point metals, such as lead, tin, zinc and aluminum, and have been commercially used for some time. However, experiments in gaseous combustion atmospheres showed that ordinary sweating procedures were not satisfactory for the copper-iron system due to oxidation of iron and entrapment of copper within the oxide scale. A reducing atmosphere diminishes scaling, but enhances the tendency for copper to alloy with iron.

In our previous work, we discovered that if the sweating is accomplished in a neutral molten substance such as barium chloride, both oxidation and alloying of copper and iron are lessened and the liquid bath promotes rapid heat transfer. This technique was shown to be useful for reclaiming the components of copper-iron scrap items such as armatures, some types of electronic scrap and gilding metal. A report on this previous work was published in Secondary Raw Materials, Vol. 6, No. 7, July 1968, pages 27-29. Although this technique constituted a considerable improvement over conventional sweating methods, the residual iron (such as the steel core of scrap armatures) still retained several percent of copper.

SUMMARY OF THE INVENTION

We can achieve a nearly quantitative separation of copper from iron by first pretreating scrap with selected chemical reagents prior to preferentially melting the copper in a neutral, molten medium. These chemical reagents alter and coat the surface of the iron so it is less subject to brazing in the molten bath. It is believed that these reagents render the iron less susceptible to alloying with copper either by controlled, mild oxidation or by coating the iron surface with a non-reactive substance. Preferred reagents include the alkali metal sulfates and silicates.

It is therefore an object of our invention to separate copper from iron.

A specific object of our invention is to reduce the alloying of copper with iron in those separation processes in which copper is preferentially melted and separated from copper-iron scrap.

Another object of our invention is to increase the copper recovery and increase its purity by the preferential melting of copper contained in copper-iron scrap by immersion in a molten, inert, liquid medium.

DETAILED DESCRIPTION OF THE INVENTION

Our invention comprises the chemical pretreatment of copper-iron scrap commodities followed by preferential melting and separation of the copper in a molten medium bath. Chemical pretreatment is accomplished by coating the scrap with a reagent which prevents or inhibits the alloying or brazing of copper with iron. Preferred chemical reagents comprise the alkali metal sulfates and silicates. We particularly prefer sodium sulfate and sodium silicate as reagents in our process.

The pretreatment may be accomplished by immersing scrap components into a reagent solution or by spraying or brushing the solution onto the components. It is unimportant how the reagent is applied as long as all iron surfaces are thoroughly coated. A method preferred because of its ease and simplicity is to dip scrap components into saturated reagent solutions for a minute or two and then dry at room temperatures of 100° C or more. Drying must be thorough in order to avoid the almost explosive formation of steam which would result were liquid water to be introduced into a molten bath at a temperature above the melting point of copper. Drying may be incorporated as part of a preheating step desirably included in order to reduce the heat requirement of the molten bath.

While we have found the alkali metal sulfates and silicates to be generally useful in our process, we prefer sodium sulfate and sodium silicates primarily because of their availability and economy. Sodium silicates generally are operative in our process so long as they are water soluble. Ratio of $Na_2O$ to $SiO_2$ contained in the silicate reagent appears to have little if any effect on the process. Useful forms of sodium silicate include but are not limited to sodium disilicate, sodium metasilicate and sodium orthosilicate as well as the sodium silicate commonly referred to as water glass. The reagent may be made up for use as an aqueous solution conveniently having a concentration in the range of about 5 percent to 60 percent. Temperature at which scrap components are treated with the reagent solution is unimportant but from a practical viewpoint should be below the boiling point of the solution. Most conveniently, treatment temperature should be ambient or slightly above.

In practicing our invention, the molten medium used in preferentially melting copper may be any salt, slag or glass which is stable, noncorrosive, and relatively non-volatile at a temperature above the melting point of copper. In addition, the medium preferably is relatively inexpensive. Materials such as silicate slags (from iron foundries and copper smelting) barium chloride, calcium chloride and the like are well suited for use as the molten medium. Commercial heat-treating salts for high-speed steel were also used successfully; these are proprietary mixtures with barium chloride as a principal component. The temperature range in which the preferential melting of copper may be carried out is limited to a temperature above the melting point of copper and below the melting point of iron, or from about 1,083° to 1,450° C. We prefer to operate in the lower portion of that range or from about 1,100° to 1,300° C. Higher temperature operation increases the tendency of copper to alloy with iron, increases medium losses due to volatilization and increases the heat requirements of the process.

Apparatus suitable for use in the preferential melting step of our process may comprise commercial furnaces such as those salt bath furnaces used in heat treating steel articles. These furnaces are typically internally heated by electrical resistance and are capable of continuous service at temperatures as high as 1,300° C. If desired, these standard furnaces may be modified to provide a semi-continuous discharge of molten copper by providing suitable tapping means in the lower portion of the salt pot.

TABLE 1

| Test number | Separating media | Temp., °C. | Residual analysis of steel cores, percent Cu | | | Copper lost in steel cores, percent of total | | |
|---|---|---|---|---|---|---|---|---|
| | | | No pre-treat. | $Na_2SO_4$ dip | $Na_2SiO_3$ dip | No pre-treat. | $Na_2SO_4$ dip | $Na_2SiO_3$ dip |
| 1 | $BaCl_2$ | 1,150 | 2.75 | 0.27 | 0.14 | 9.9 | 0.8 | 0.5 |
| 2 | $BaCl_2$ | 1,200 | 5.19 | 0.26 | 0.12 | 12.7 | 0.6 | 0.3 |
| 3 | $BaCl_2$ | 1,250 | 5.71 | 0.37 | 0.18 | 21.4 | 1.0 | 0.7 |
| 4 | $CaCl_2$ | 1,150 | 6.98 | 1.74 | 3.38 | 19.9 | 4.9 | 9.1 |
| 5 | $CaCl_2$ | 1,200 | 4.75 | 3.64 | 2.56 | 15.6 | 8.7 | 7.2 |
| 6 | $CaCl_2$ | 1,250 | 4.69 | 1.18 | 3.28 | 18.0 | 3.5 | 9.3 |

A general procedure for carrying out our process is as follows. Scrap items containing copper and iron such as motor armatures or electronic scrap are first cleaned and degreased if necessary. The clean scrap is then dipped into the aqueous reagent solution and thoroughly dried. Preheating of scrap items to a temperature of several hundred degrees Centigrade may follow or form a part of the drying operation if desired. The scrap items are then immersed in a molten medium, such as barium chloride, maintained at a temperature above about 1,100° C. Immersion time must be sufficient to melt the contained copper and is typically in the range of about 1 to 15 minutes. Stainless steel mesh baskets have proven satisfactory to hold the scrap components during the immersion. The basket, retaining the iron portion of the scrap items, is then removed from the bath and is shaken or vibrated to remove any adhering liquid medium or molten copper. Copper sinks to the bottom of the bath where it remains in the liquid state and may be periodically tapped. The copper product analyzes 96 percent or more copper with the balance being mostly iron and small percentages of lead, zinc, aluminum and the like depending upon the scrap being processed. Residual copper content of the iron depends to some extent on the scrap items processed and upon the composition of the molten medium but will generally range from about 0.1 to about 3 percent.

The following examples illustrate specific embodiment of our invention.

EXAMPLE 1

A number of small (1-¾ in. diameter) armatures were divided into three lots. One lot was treated by dipping in a saturated solution of sodium sulfate, a second lot was treated by dipping in a saturated solution of sodium silicate, while the third lot was not treated. The armatures were then dried at about 100° C. A series of preferential melting tests were run on each lot using barium chloride and calcium chloride as the molten medium, at temperatures of 1,150°, 1,200° and 1,250° C.

A graphite crucible, heated by an induction furnace, was used to hold the liquid medium. Temperature was measured with an optical pyrometer. A motor armature, pretreated as described, was placed in the molten salt bath with tongs and was allowed to attain equilibrium temperature. This required a minute or two after which the armature was soaked in the bath for a time period ranging from about 1 to 15 minutes. Copper droplets sweated from the scrap and collected in the bottom of the crucible. The armature was then shaken to remove adhering salt and molten copper, then dropped on a hard surface to further reduce adhering liquid. An analysis for copper was then performed on each of the steel armature cores. Results obtained in these tests are summarized in the following table.

As may be seen from the data, our pretreatment spectacularly improves the recovery of copper when barium chloride is used as the molten medium. Gains realized by the pretreatment using calcium chloride as the molten medium are not as great but are still substantial. Although the barium chloride medium proved superior from a technical viewpoint, there may be advantages in the use of calcium chloride because of its lower price. Both the barium chloride and calcium chloride baths were reused many times without apparent change in their characteristics.

EXAMPLE 2

We evaluated our technique in the recovery of copper from a mixed group of copper-base electronic components using a barium chloride bath. The components were placed in a stainless steel mesh basket and were immersed in the bath for 5 minutes at 1,250° C. Copper recovered amounted to 85.7 percent of the input weight with 0.9 percent iron present as an impurity. Copper recovery was lower with electronic components than with armatures because of their greater physical complexity.

EXAMPLE 3

Salt mediums were prepared using barium chloride as a major component with sodium sulfate being added in amounts of 5, 10 and 20 percent. The salts were then evaluated as a molten medium for use in the preferential melting of copper. Test objects were armatures as in Example 1 and the procedure of that example was followed except that the armatures were not chemically pretreated. Object of these tests was to determine whether sodium sulfate would function as a bath component in the same way it functioned as a pretreating reagent. Performance of the barium chloride-sodium sulfate salt mictures was essentially equivalent to that of barium chloride alone. Sodium sulfate incorporated into the bath did not display the alloy inhibiting action exhibited when it was used in aqueous solution as a pretreating reagent.

We claim:

1. A process for recovering copper from composite scrap items containing elemental copper and iron in physical admixture which comprises:

coating the scrap items with an aqueous solution of a chemical reagent which renders the iron less susceptible to alloying with copper;

drying the coated scrap items;

immersing the dried coated scrap items in a neutral molten medium maintained at a temperature above the melting point of copper but below the melting point of iron for a time sufficient to preferentially melt the elemental copper contained in the composite scrap items; and separating the molten copper from the unmelted iron portion of the composite scrap items.

2. The process of claim 1 wherein the chemical reagent is chosen from the group consisting of alkali metal sulfates and alkali metal silicates.

3. The process of claim 2 wherein the molten medium is stable and relatively non-volatile at temperatures above the melting point of copper.

4. The process of claim 3 wherein the molten medium is chosen from the group consisting of salts, slags and glasses.

5. The process of claim 4 wherein the molten medium is maintained at a temperature within the range of 1,100° to 1,300° C.

6. The process of claim 5 wherein the chemical reagent is chosen from the group consisting of sodium sulfate and sodium silicates.

7. The process of claim 6 wherein the scrap items are treated by dipping in a relatively concentrated reagent solution.

8. The process of claim 6 wherein the medium comprises calcium chloride and wherein the reagent is sodium sulfate.

9. The process of claim 6 wherein the medium comprises calcium chloride and wherein the reagent comprises sodium silicate.

10. The process of claim 6 wherein the medium comprises barium chloride and wherein the reagent is sodium sulfate.

11. The process of claim 6 wherein the medium comprises barium chloride and wherein the reagent comprises sodium silicate.

12. The process of claim 6 wherein the scrap items are suspended in a perforated steel basket during immersion in the molten medium.

13. The process of claim 6 wherein the molten medium is contained within a crucible-type furnace and wherein molten copper is collected at the bottom of the crucible.

* * * * *